United States Patent
Dolgin

(10) Patent No.: US 9,332,082 B2
(45) Date of Patent: *May 3, 2016

(54) SYSTEM AND METHOD FOR INSTANTANEOUSLY DEPLOYING PACKETIZED ALERT DATA

(75) Inventor: Jess Z. Dolgin, Los Angeles, CA (US)

(73) Assignee: E-SHOP ENTERPRISES, LLC, Los Angeles, CA (US)

( * ) Notice: Subject to any disclaimer, the term of this patent is extended or adjusted under 35 U.S.C. 154(b) by 199 days.

This patent is subject to a terminal disclaimer.

(21) Appl. No.: 13/616,921

(22) Filed: Sep. 14, 2012

(65) Prior Publication Data

US 2013/0007630 A1 Jan. 3, 2013

Related U.S. Application Data

(63) Continuation of application No. 12/781,726, filed on May 17, 2010, now Pat. No. 8,307,042, which is a continuation of application No. 11/256,243, filed on Oct. 20, 2005, now abandoned.

(60) Provisional application No. 60/621,016, filed on Oct. 20, 2004.

(51) Int. Cl.
*G06F 15/16* (2006.01)
*H04L 29/08* (2006.01)
*G06Q 30/08* (2012.01)
*H04L 12/14* (2006.01)

(52) U.S. Cl.
CPC ............... *H04L 67/26* (2013.01); *G06Q 30/08* (2013.01); *H04L 12/14* (2013.01)

(58) Field of Classification Search
CPC ......... H04L 67/26; H04L 12/14; G06Q 30/08
USPC .......................................................... 709/206
See application file for complete search history.

(56) References Cited

U.S. PATENT DOCUMENTS

| | | | |
|---|---|---|---|
| 2003/0217109 A1* | 11/2003 | Ordille et al. | 709/206 |
| 2004/0068481 A1* | 4/2004 | Seshadri et al. | 707/1 |
| 2004/0128359 A1* | 7/2004 | Horvitz et al. | 709/207 |
| 2004/0172454 A1* | 9/2004 | Appelman et al. | 709/206 |

* cited by examiner

*Primary Examiner* — Hee Soo Kim
(74) *Attorney, Agent, or Firm* — Katten Muchin Rosenman LLP

(57) ABSTRACT

One or more embodiments of the invention are directed to a system and method for instantaneously deploying packetized alert data in a one to many configuration or a many to many configuration where the data to be received by each recipient can be customized in a way that leaves a publisher with optimum control over the content or revenue generated from each deployment.

10 Claims, 14 Drawing Sheets

FIG. 8

Manager's Listing

| ID | Username | Full Name | Company | Actions |
|---|---|---|---|---|
| s8 | test | | | |
| s7 | otis | | | |
| s6 | dan | | | |
| s3 | yuval | Yuval | | |

SYSTEM AND METHOD FOR INSTANTANEOUSLY DEPLOYING PACKETIZED ALERT DATA

This application is a continuation of U.S. patent application Ser. No. 12/781,726, filed May 17, 2010, now U.S. Pat. No. 8,307,042, which is a continuation-in-part of U.S. patent application Ser. No. 11/256,243, filed Oct. 20, 2005 now abandoned, which claims priority to U.S. Provisional Patent Application Serial No. 60/621,016, filed on Oct. 20, 2004, the contents of which is hereby incorporated by reference in its entirety. A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE INVENTION

1. Field of the Invention

Embodiments of the invention described herein pertain to the field of communication oriented computer software. More particularly, but not by way of limitation, the computer software described herein enables the instant deployment of alert data across disparate systems.

2. Description of the Related Art

There are various systems for deploying message data. A commonly used term for this type of real-time exchange is instant messaging. Instant messaging is inexpensive, with most vendors giving away the product and others charging nominal licensing fees. Such instant messaging systems are powerful in that they allow users to communicate in one window while, for example, looking over a document in another. Team members in different locations can set up impromptu conversations, bouncing ideas and strategies off each other.

Some examples of instant messaging systems capable of deploying message data across a network include systems such as Internet Relay Chat (IRC), AIM, MSN Messenger, Yahoo Messenger provide mechanisms for instantaneously transporting data between client computers. Generally speaking these systems provide a plurality of client systems with the ability to transmit data between each client system by transporting the data through a server system. Each of these systems identified above utilizes its own protocol to transport data and message data from one system cannot currently cross over to another system. The best-known instant messaging system is America Online's Instant Messenger (AIM). AIM is software that anyone with an Internet connection can download, whether they are an AOL member or not. After registering a screen name, the user can maintain lists of AOL members and other AIM users, and be alerted whenever one of those in the list comes on-line. When one of those in the list comes on-line, the corresponding screen name appears in an AIM interface window on the screen. By clicking on the name appearing in the AIM interface window, the user may then send an instant message and initiate a conversation session. Users can also sort their buddies into groups.

There are a number of patented system relating to the deployment of data. For instance, U.S. Pat. No. 5,740,549 describes an information and advertising distribution system. A data server stores and updates a database of information items and advertisements. The information items and advertisements are each categorized so that each has an associated information category. Workstations remotely located from the data server each include a display device, a communication interface for receiving at least a subset of the information items and advertisements in the data server's database and local memory for storing the information items and advertisements received from the data server. An information administrator in each workstation establishes communication with the data server from time to time so as to update the information items and advertisements stored in local memory with at least a subset of the information items and advertisements stored by the data server. An information display controller in each workstation displays on the workstation's display device at least a subset of the information items and advertisements stored in local memory when the workstation meets predefined idleness criteria. At least a subset of the workstations include a profiler for storing subscriber profile data. The subscriber profile data represents subscriber information viewing preferences, indicating information categories for which the subscriber does and does not want to view information items. The information display controller includes a filter for excluding from the information items displayed on the display device those information items inconsistent with the subscriber profile data.

U.S. Pat. No. 6,782,415 describes a closed-loop message distribution system configured to accept documents from a variety or sources via a plurality of media, presenting the documents to a plurality of recipients through their preferred communications channel, document personalization, and suppressing delivery of follow-up documents to those recipients who have responded to an earlier related message.

U.S. Pat. No. 6,430,602 describes a method and system for interactively responding to queries from a remotely located user includes a computer server system configured to receiving an instant message query or request from the user over the Internet. The query or request is interpreted and appropriate action is taken, such as accessing a local or remote data resource and formulating an answer to the user's query. The answer is formatted as appropriate and returned to the user as an instant message or via another route specified by the user. A method and system of providing authenticated access to a given web page via instant messaging is also disclosed.

There is a need for a system and method for instantaneously deploying packetized alert data in a one to many configuration or a many to many configuration where the data to be received by each recipient can be customized in a way that leaves a publisher with optimum control over the content or revenue generated from each deployment.

SUMMARY OF THE INVENTION

One or more embodiments of the invention are directed to a system and method for instantaneously deploying packetized alert data in a one to many configuration or a many to many configuration where the data to be received by each recipient can be customized in a way that leaves a publisher with optimum control over the content or revenue generated from each deployment. Systems enabling one or more aspects of the invention comprise a scalable set of server computers coupled through an interconnection fabric such as a computer network (e.g., wired or wireless) to a set of recipient computers. The server or set of servers is configured to interface with a plurality of independent publishing systems where each publisher can customize the content and interface within which a set of packetized alert data messages will be delivered. Through a message delivery interface tied into the publishing system an administrator has the ability to exercise control over the instantaneous deployment of messages contained within the packetized data. The functionality implemented by the message delivery interface is described and shown in FIGS. 3-12.

Communication modules located on each of the recipient computers are coupled to the server system and configured to function as a conduit for transporting packetized data to the recipient computer. In one or more embodiments, the communication module remains active so long as predefined billing criteria are maintained. Data can be forwarded to an address (e.g., IP address, MAC address, telephone number, television ID, or any other method for identifying a device with the display area) at time increments determined by the publisher rather than queried or obtained from the server at the request of a client computer. At the destination address (e.g., recipient-user computer) software is configured to make use of a screen region representative of the output of communication module as displayed via delivery/display interface.

In one or more embodiments, packetized alert data messages originating from multiple publishers can be delivered to a recipient device and displayed on a single screen region of the recipient device. The screen region is capable of displaying data received in various protocols and can, for instance, display HTML data, XML, data, image data, audio data, video data, plug-in data and other data packaged as an atomic unit and sent to communication module for display via screen region.

In one or more embodiments, a user may opt to accept contextual data identified as relevant to a user. Furthermore, a publisher may opt to deliver contextual data identified as relevant to a recipient user.

BRIEF DESCRIPTION OF THE DRAWINGS

FIG. 8 depicts a manager identification interface configured in accordance with one or more embodiments of the invention.

FIG. 10 illustrates an options interface for defining publisher specific preferences.

FIG. 11 depicts the client link interface and illustrates some of the types of information that can be defined per publishing entity.

DETAILED DESCRIPTION

One or more embodiments of the invention are directed to a system and method for instantaneously deploying packetized alert data in a one to many configuration or a many to many configuration where the data to be received by each recipient can be customized in a way that leaves a publisher with optimum control over the content or revenue generated from each deployment. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances specific features well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
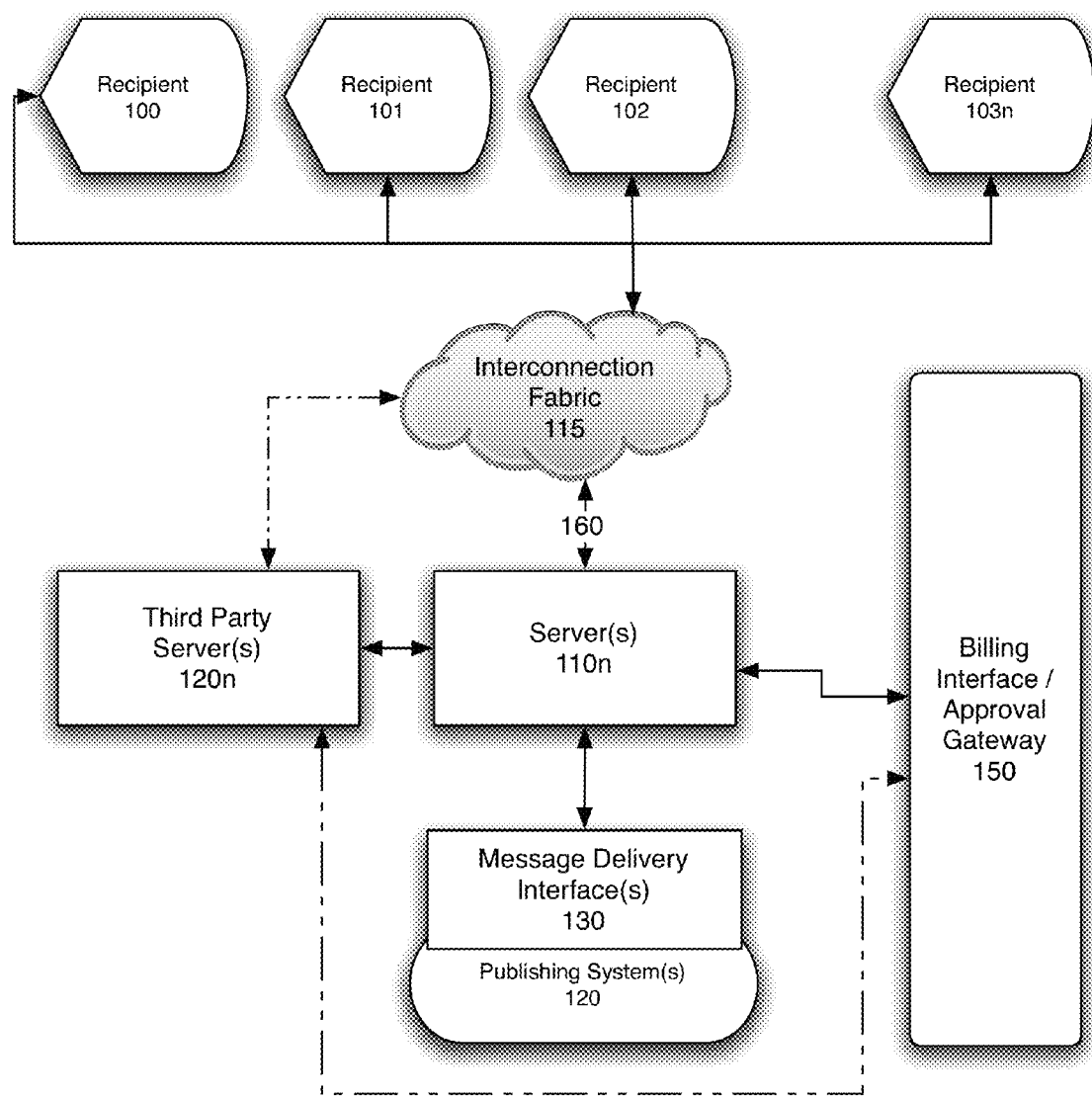
FIG. 1 is a block diagram of a system for instantaneously deploying packetized alert data in a one to many configuration or a many to many configuration where the data to be received by each recipient can be customized in a way that leaves a publisher with optimum control over the content or revenue generated from each deployment.

FIG. 1 is a block diagram that illustrates components of a system for instantaneously deploying packetized alert data. Systems enabling one or more aspects of the invention comprise a scalable server or set of server computers (110n) coupled through an interconnection fabric (115) such as a computer network (e.g., wired or wireless) to a set of recipient computers (100-103n). The set of servers is configured to interface with a plurality of independent publishing systems (120) where each publisher can customize the content and interface within which a set of packetized data messages will be delivered. Through a message delivery interface tied into the publishing system an administrator has the ability to exercise control over the instantaneous deployment of messages contained within the packetized data. The term deployment as used herein is meant to include broadcast, multi-cast, peer-to-peer, client-server, or any other network topology that allows data to be transmitted/received between two points. For instance, the administrator may define what set of messages a recipient is to receive and identify a Time to Live (TTL) for each message within the set. Thus, a publisher may precisely control the time, sequence, and content of messages deployed to a plurality of recipients. In cases where the publishing system is tasked with the job of transmitting time sensitive information (e.g., news, schedules, etc. . . . ), the publisher may set an expiration threshold and discontinue the broadcast of messages subsequent to that threshold. Hence the publisher is able to control what messages are displayed at a recipient computer and how long each message is displayed for.

Figure 14:
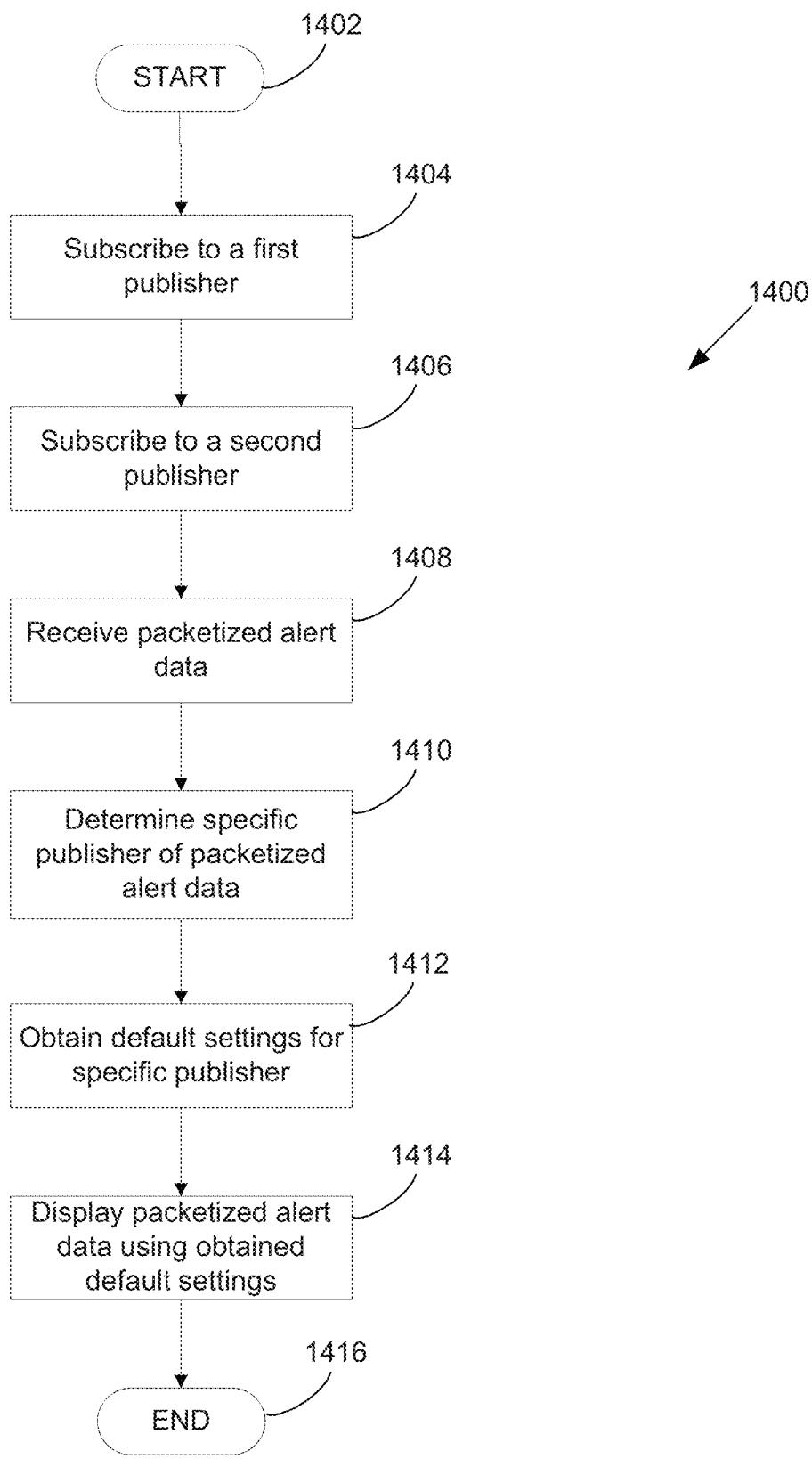
FIG. 14 is a flow chart that shows an exemplary process for a recipient user to receive packetized alert data in accordance with one or more aspects of the invention.

As shown in FIG. 1, a plurality of publishing systems (120) may send customized content in the form of packetized alert data to recipient users (100-103n) through an interconnection fabric (115). FIG. 14 is a flow chart of an exemplary process for a recipient user to receive packetized alert data from multiple publishers in accordance with one or more embodiments of the invention. Process 1400 begins at step 1402. Processing continues to step 1404, where the user subscribes to a first publisher. By subscribing, the user consents to receiving information from a particular publisher without having to initiate a specific request for every alert or message to be disseminated. The user and/or the first publisher may specify default settings identifying the category or other type of messages to receive, and the mode of transmission, the configuration of the screen region, the length of time to display a message, acknowledgement of the message, authentication, or any other setting. In one or more embodiments, packetized alert data may also indicate custom settings which apply to a specific message.

Processing continues to step 1406, where the user subscribes to a second publisher. By subscribing, the user consents to receiving information from the second publisher without having to initiate a specific request for every alert or message to be disseminated. The user and/or the second publisher may specify default settings identifying the category or other type of messages to receive, and the mode of transmission, the configuration of the screen region, the length of time to display a message, acknowledgement of the message, authentication, or any other setting. In one or more embodiments, packetized alert data may also indicate custom settings which apply to a specific message.

Processing continues to step 1408, where packetized alert data is received. At step 1410, the specific publisher associated with the packetized alert data is determined. Processing continues to step 1412, where the default settings for the display of the packetized alert data from the specific publisher are obtained. Processing continues to step 1414, where the packetized alert data is displayed using the settings of the specific publisher from which the packetized alert data originated. In one or more embodiments, packetized alert data from multiple publishers is displayed in a single screen region of a display of a user, such as a computer monitor display, a television display, a mobile device display, or any other display device configurable to display packetized alert data. The screen region may be modified based on settings specified in the packetized alert data or the default settings for a specific publisher. Processing continues to step 1416, where process 1400 terminates.

Figure 2:
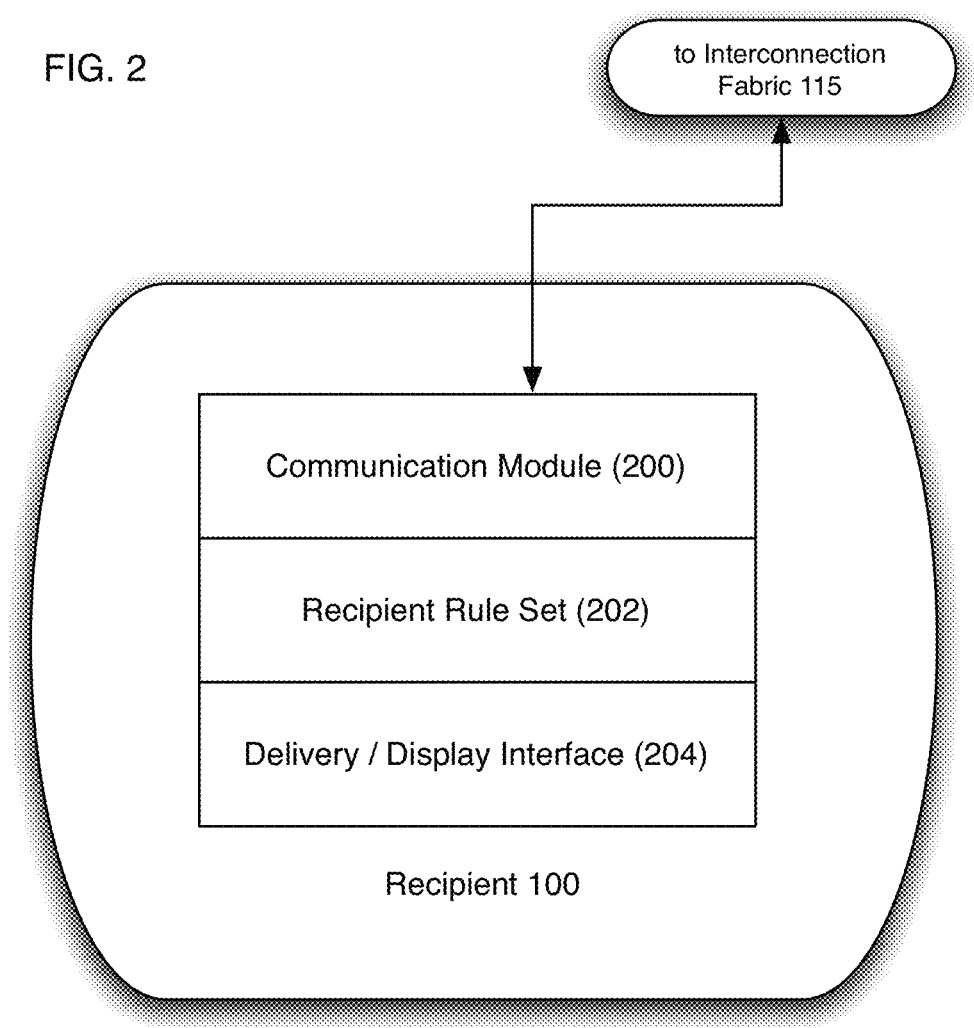
FIG. 2 is a logical diagram illustrating the components of a recipient computer coupled with an interconnection fabric as configured in accordance with one or more embodiments of the invention.

FIG. 2 is a logical diagram illustrating the components of a recipient computer 100 coupled with interconnection fabric 115 as configured in accordance with one or more embodiments of the invention. Each recipient computer (100-103n) comprises a communication module (200) configured to access the set of server computers to obtain the packetized alert data and display that data in accordance with a set of rules defined by a user of the recipient computer. Hence in addition to the publisher having control over message delivery users have the ability to filter or identify rules (202) defining when certain messages are to be delivered and displayed (204). In certain cases, publishers may override these user-defined rules to ensure critical messages are delivered to recipient computers. A publisher may, for instance, decide to always deliver Emergency Broadcast Messages, certain corporate messages or other messages deemed to be of importance. In other examples the message recipient may indicate certain messages are to be received at certain times of day. As an example, but not by way of limitation, a lawyer may wish to receive all information transmitted from a Court of Law, between the hours of 9-5, but otherwise indicate that such information is not to be transmitted. Recipients also have the ability to designate messages to be received by subject. A medical doctor may, for instance, indicate that information about important medical research is to be received, where a layperson may not wish to receive such information. In one or more embodiments but not by way of limitation, a recipient user may subscribe for a service providing instantaneous alert data, including a paid subscription for one or more categories of instantaneous alert data. In one or more embodiments but not by way of limitation, a publisher, such as a employer, university, school, or any other publisher, may require recipient users to receive instantaneous alert data, including instantaneous alert data associated with one or more categories. For example, but not by way of limitation, a university publisher may require registered students to receive instantaneous alert data from one or more categories, such as instantaneous alert data associated with a category for a course for which the student is registered, an association for which the student is a member, a general category for all registered students, or any other category for which alerts are separately manageable.

Communication module 200 is coupled to the server system and a conduit for transporting packetized data to the recipient computer remains active while predefined billing criteria are optionally maintained. The communication module can utilize various transport mechanisms to obtain data from the server system, such as HTTP, FTP, WAP, or any other logical protocol for transmitting data between two points. The system can utilize presentation layer engines such as Gecko or IE to render and layout the packetized data in a format customized as per the publisher requirements. Different users may also set different publication preferences. Data is forwarded to an address (e.g., IP address, MAC address, telephone number, television ID, or any other method for identifying a device with the display area) at time increments determined by the publisher rather than queried or obtained from the server at the request of a client computer.

In one or more embodiments of the invention data is forwarded to a recipient upon initiation of a publisher who may optionally choose to secure the communication link (115) via Secure Sockets Layer (SSL) or via any other suitable encryption technology. Users at the recipient computer may respond to the publisher by providing information such as survey data, purchase data or any desired data. A publisher may, for instance, instantaneously transmit data such as news or survey questions along with an accompanying response form. Users may complete the form and submit that information back to the publisher via the same conduit used for transmission of the data. The invention contemplates the inclusion of a mechanism that allows recipient users to authenticate the identity of the publisher and hence, prior to providing requested data, the user can take steps to ensure the data is being provided to a proper party. For instance, authentication may occur through entry of a user or publisher defined password or security phrase. In cases where the publisher is communicating with a known recipient, complementary encryption keys may provide a method for verifying the identity of each respective party. Other checks or verification procedures are also feasible and contemplated as being within the scope and spirit of the invention, but not described here for purposes of brevity.

Figure 3:
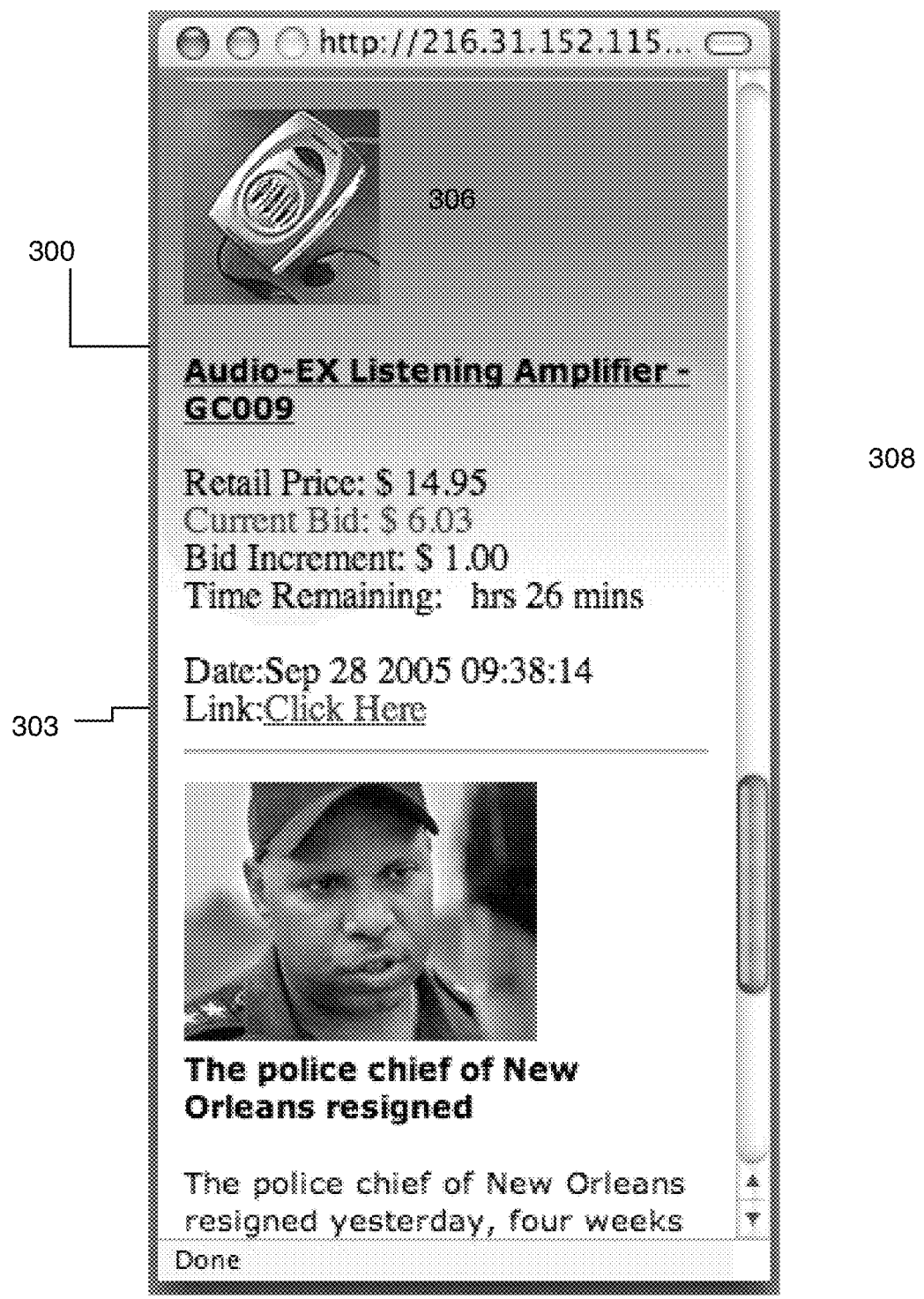
FIG. 3 illustrates a screen region representative of the output of communication module as displayed via delivery/display interface in accordance with one or more embodiments of the invention.

FIG. 3 illustrates a screen region representative of the output of communication module 200 as displayed via delivery/display interface 204. Screen Region 300 is capable of displaying data received in various protocols and can, for instance, display HTML data, XML, data, image data, audio data, video data, plug-in data and other data packaged as an atomic unit and sent to communication module 200 for display via screen region 300. For example, the data, including HTML data, XML data, image data, audio data, video data, plug-in data and any other type of data may include audio and/or video data, including embedded audio and/or video data, digital television broadcasts, advertisements, and Emergency Broadcast Messages. In the example depicted in FIG. 3, image data (301) and text data with accompanying hyperlinks is pushed to the communication module 200 for display via screen region 300 as per the rules specified by the publisher and the user. Although data is typically pushed to a recipient data can also be pulled from a recipient or initiated by the recipient. Hence at least one embodiment of the invention allows for the bidirectional flow of data between the server(s) and the recipients.

The user, for instance, may opt to accept data that pertains only to a specific category of information. In some cases information is continuously updated on screen region 300 as it changes on server(s) 110*n*. The data to be displayed on screen region 300 may be defined on the server and remain static until changed or it can be updated based on data taken from an independent source such as another server. In the case where auction data or other kinds of rapidly changing data (308) is instantaneously transmitted to communication module 200 for display via screen region 300, server(s) 110*n* may monitor the status of data on another server and act as a conduit for the data when a change or update occurs.

In one or more embodiments, a user may opt to accept contextual data identified as relevant to a user. Furthermore, a publisher may opt to deliver contextual data identified as relevant to a recipient user. Relevant contextual data may be identified based on a user's preferences, user-submitted information, demographic information, information collected about a user, information supplied from a mobile device, or any other method for collecting and processing information about a user. In one or more embodiments, relevant contextual data is determined based on location information.

Packetized alert data may be event driven. In one or more embodiments, one or more messages are automatically delivered upon a triggering event based on contextual data. For example, the one or more messages may include a welcome message, scheduled event notifications, deadlines, reminders, instructions for responding to a event such as a natural disaster, donation requests, detour information, evacuation routes, voting instructions, public service announcements, instructions for completing a form (such as a tax form, a census, a survey, or any other form), or any other information suitable for disseminating upon a triggering event.

In an auction for example, the price of the current bid and time remaining can be updated as it changes on the server hosting the auction. Links that are sent to display region 300 may reference data from server(s) 110*n* or data from third party server(s) 120*n*. Upon selection of hyperlink 303 for instance a web page that provides further information or otherwise complements the displayed information is obtained and displayed to the user in a web browser. Hence in one embodiment of the invention screen region 300 displays information that is defined and initially sent to a recipient via server 110*n*, but which links back to information contained on a third-party server 120*n* or on server 110*n* itself. Image data (306) may be configured to act as a link or be transmitted for display as image data alone. The layout of screen region is controlled by markup data or other data present on server 110*n*.

It is also possible to use embodiments of the invention to instantaneously broadcast form data to a plurality of users for purposes of completion. This form data may be transmitted in http://www.dmv.ca.gov/pubs/dl600.pdf numerous contexts and provides a way for users to submit a response to server 110*n* or third-party server 120*n*. News entities could, for instance, embedded surveys in stories being pushed to their readers and obtain immediate feedback about the story for any suitable purpose. Executives can broadcast surveys to employees of customers for purposes of addressing a specific issue and obtain instantaneous feedback. Members of a group can obtain information from other members for purposes of a vote or other need by instantaneously broadcasting a form to the members for completion. Advertisers can deploy ads to a known test market that has a well-defined set of characteristics and seek specific feedback by accompanying the advertisement with a form asking for feedback.

It is possible to utilize the system for instantaneously deploying packetized data described herein as a stand-alone communication channel or as a complement to an existing communication methodology. In instances where a pre-existing relationship exists between the publisher and the recipient (e.g., company/customer, employer/employee, school/student, or any other pre-existing one to many or many to many relationship) the system can be used in place of technologies such as email to provide a structure to send and receive data. If a customer is contacting technical support to ask a question, the publisher (in this case the entity providing technical support) may affirmatively transmit basic questions to the inquirer while that person is on hold or during the phone call. Hence the system provides a secure conduit for sending and fetching select information from a distinct group of identifiable recipients.

Figure 12:
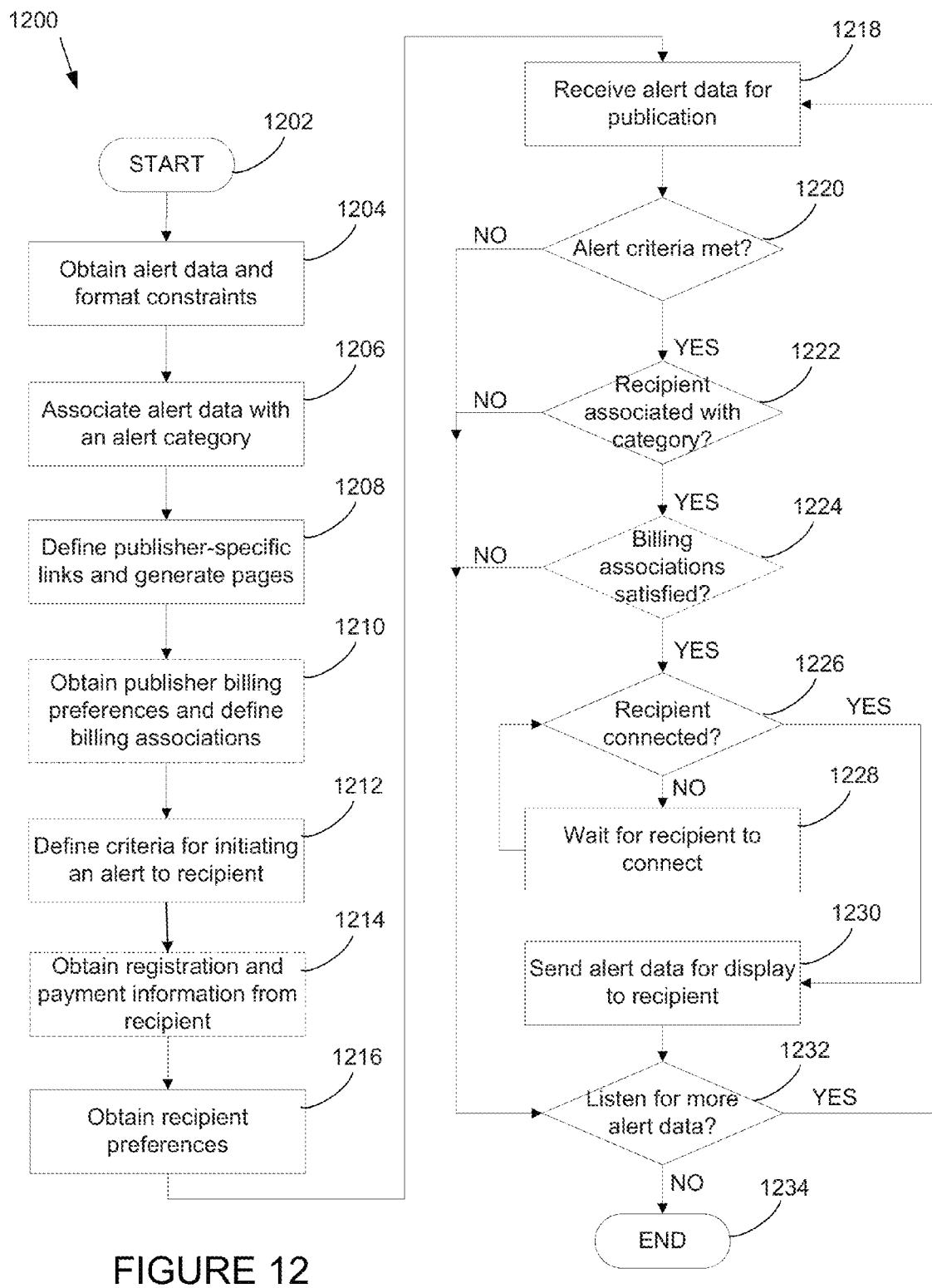
FIG. 12 is a flow chart that shows an exemplary process for delivering packetized alert data in accordance with one or more aspects of the invention.

FIG. 12 is a flow chart illustrating exemplary steps for delivering alert data in accordance with one or more embodiments of the invention. Embodiments for delivering alert data may change, switch, omit, and concurrently perform (e.g. in a multithreaded system) process steps shown in exemplary process 1200 without departing from the spirit and scope of the invention. Process 1200 begins at step 1202.

Processing continues to step 1204, where alert data and format constraints are obtained. Alert data may be defined via the alert interface 400 described in more detail at FIG. 4. Alert data may also be defined by pulling format constraints and content from other sources independent of alert interface 400, but is generally constrained by conditions set by the publisher via alert interface 400.

Processing continues to step 1206, where the alert is associated with one or more categories, such as via category definition component 412 as described in more detail below.

Processing continues to step 1208, where publisher-specific links and other data associated with the alert are defined.

Processing continues optional steps 1210, where publisher billing preferences and associations may be defined in a billing-based subscription system. A publisher may, for instance, define when to initiate billing cycles and what the terms are for revenue sharing with other publishers in the event that such sharing is desired.

Processing continues to step 1212, where the criteria for transmitting an alert to Recipient-Users are defined. For instance, the publishing user can specify time intervals for sending alert data or define other actions or events that will cause alert data to be transmitted. Publishers can also opt to send alerts at their sole discretion and not based on any particular time or other such criteria. This criteria for transmitting alerts can be defined via schedule definition interface 900 which is described in further detail at FIG. 9.

Processing continues to optional step 1214, where registration and payment information is obtained from the recipient-users and other information as required by each specific publisher is collected in a billing-based subscription system.

Processing continues to step 1216, where recipient of alert preferences are obtained. We sit the alert preferences may include a selection of at least one category of alerts a recipient-user desires to receive and software to enable the transmission of instantaneous alert data Processing continues to step 1218, where alert data is received for publication. Once the initial publisher setup and recipient-user setup is achieved, the system monitors what users are connected (see e.g., member connection interface described at FIG. 7) to deliver alert data to the appropriate recipients, such as by using the process outlined in steps 1220-1232. At decision step 1220, it is determined whether alert criteria has been met. At decision step 1222, it is determined whether a recipient is associated with the category of the alert. At optional decision step 1224, it is determined whether billing associations are satisfied. If alert criteria has been met, a recipient is associated with a category, and a billing associations are optionally satisfied, processing continues to step 1226. Otherwise, processing continues to step 1232.

At decision step 1226, it is determined whether a recipient is connected. If the recipient is connected, processing continues to step 1230, where the alert data is sent for display to the recipient. Otherwise, processing continues to step 1228, where the process waits for the recipient to connect and return to step 1226 to determine whether the recipient is connected.

Returning to step 1230, processing continues to decision step 1232, where it is determined if the system should listen for more alert data to receive. If the system will continue receiving alert data for publication, processing returns to step 1218. Otherwise, processing continues to step 1234, where process 1200 terminates.

Figure 4:
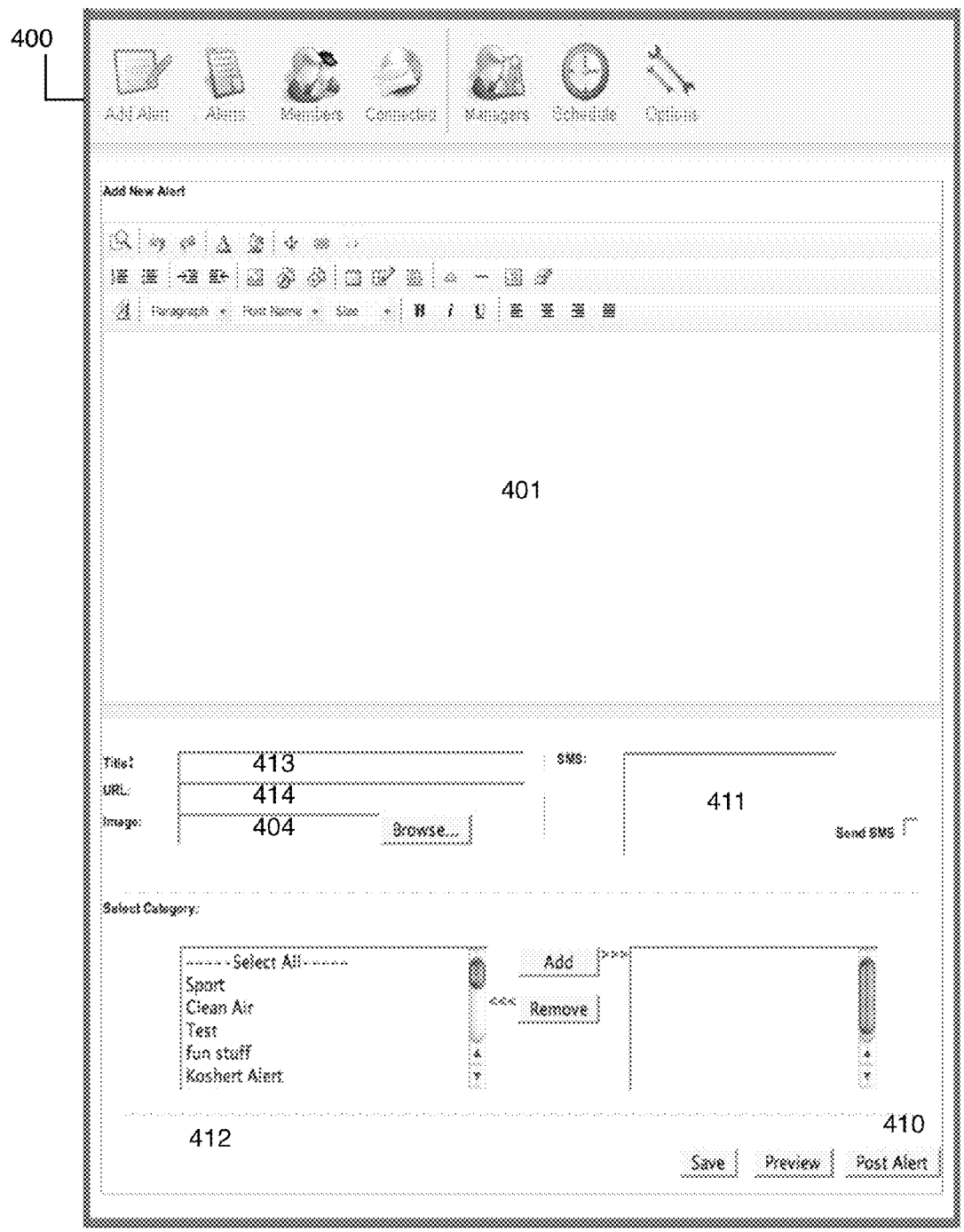
FIG. 4 shows an add alert interface and functions available to the publishing system in accordance with one or more embodiments of the invention.

FIG. 4 shows an add alert interface and functions available at publishing system 120. To define and format data for delivery to users via the instantaneous notification system a publisher-user defines the contents of the alert in a formatting control interface 401. Alert interface 400 contains a set of tools that provide the user with various functions for modifying the appearance of the alert that is to be transmitted via the instant notification system. In one embodiment of the invention alert data (an example of which is depicted in FIG. 3) are formatted as web pages constrained to meet the requirements of the display region within which they will be displayed. When the alter data is formatted as a web page it is assigned a title (413) and URL (414) by the publishing user. Images or other embedded data or plug-ins to be pushed to recipients of the alert data are identified via the alert interface 400 at image link 404. In one embodiment of the invention each formatted set of alert data is associated with one or more categories at category definition component 412. The publishing user can add or remove categories as desired. Recipients can opt to only receive data that relates to certain categories (e.g., via Rule Set 202) and as such control what data is presented to them via the instant notification system. Once a message is formatted for display on screen region 300 via formatting control interface 401 the alter may be posted via post mechanism (410) for inclusion in the overall system.

In one embodiment of the invention publishing users may also define a mobile device message version, such as a Short Message Service (SMS) version or Multimedia Message Services (MMS) version of the alert which is to be transmitted simultaneous with the version formatted for screen region 300 or independent of the screen region 300 version. As used herein, the term mobile device refers to any mobile telecommunications device configured to communicate through a wireless telecommunications provider, including netbooks, cell phones, smart phones, PDAs, and any other mobile telecommunications device. For example, an SMS version is formatted in the mobile device message region 411 of alert interface 400 and typically created in a way where it is formatted for display on wireless computing devices such as cell phones or PDAs. When an SMS version is formatted it is also posted via post mechanism 410. In one or more embodiments, an MMS version is formatted in a mobile device message region 411 of alert interface 400. Mobile device message region 411 may be configured to accept one or more types of mobile device messages based on the preferences of publishers or users. Mobile device message region 411 may be configured to emulate a mobile device display.

In one or more embodiments, a publisher is provided with one or more mobile device message tools through a mobile device message interface to facilitate the creation of an mobile device version of an alert from the packetized alert data. For example, a MMS interface may be provided to a publisher to provide tools to edit, compress, select or otherwise modify the packetized alert data, including text, audio, image and video data. The resulting mobile device version of the packetized alert data is suitable for transmission to a mobile device using a standard mobile messaging protocol. In one or more embodiments, a MMS interface is provided to create a deliverable SMS message from packetized alert data, including HTML data, XML data, image data, audio data, video data, plug-in data, audio and/or video data, including embedded audio and/or video data, digital television broadcasts, advertisements, and Emergency Broadcast Messages.

In one embodiment of the invention data is forwarded in accordance with criteria defined by the publisher so long as appropriate billing or other criteria are maintained. For instance, in some cases packetized alert data may only be transmitted to paying customers. When maintenance of the billing requirements ceases the conduit is terminated and transmission of the packetized data stops. The incremental revenue generated from the transmission of packetized data to the recipient computers is proportionally shared with the operator of the publishing system. Once a connection is established with a recipient billing constraints are setup to ensure a relatively predictable revenue stream.

Figure 5:
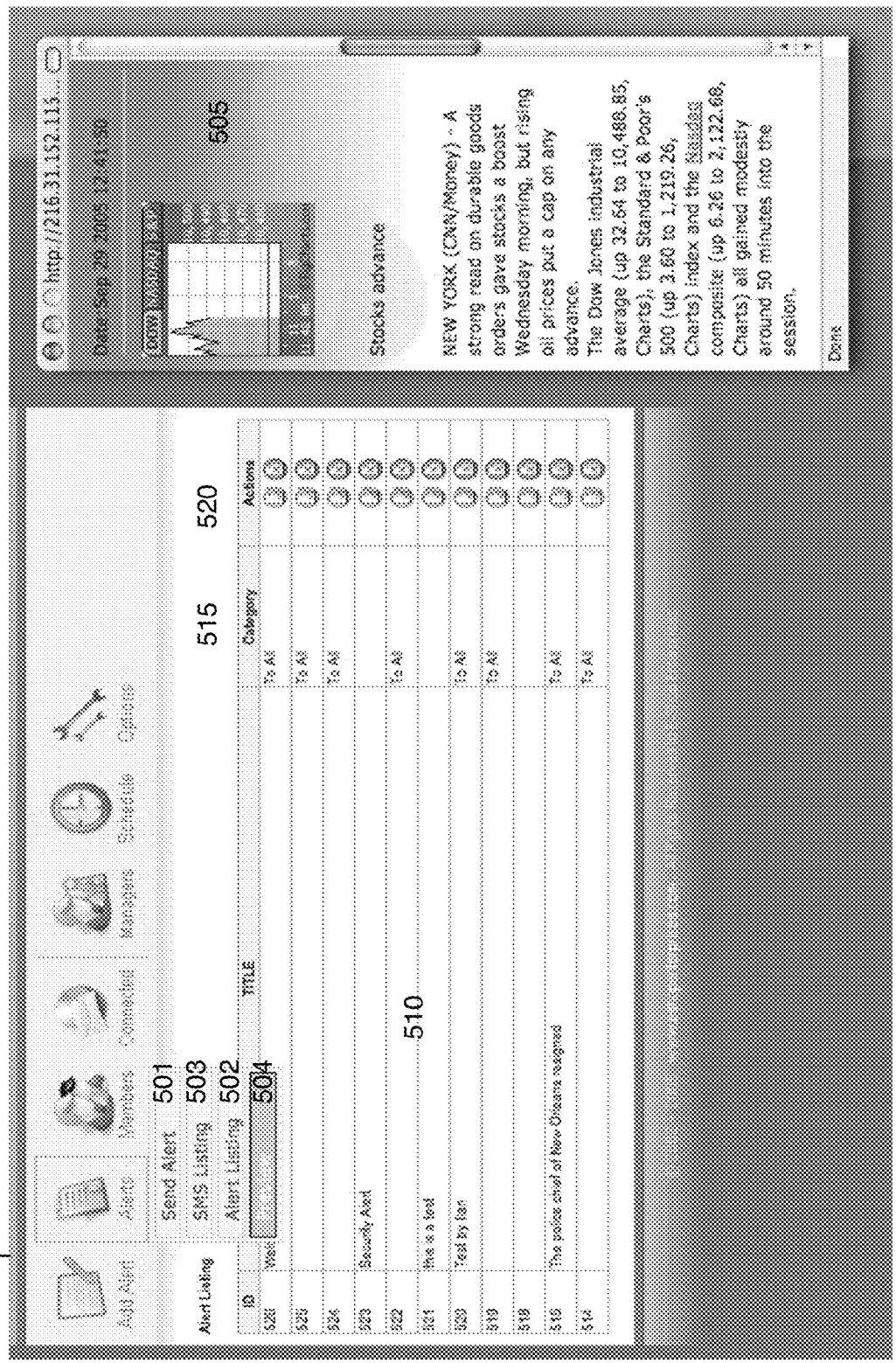
FIG. 5 shows an alert control interface for handling the functions and conditions for viewing and controlling the alert data in accordance with one or more embodiments of the invention.

Once an alert is created, the functions and conditions for viewing and controlling the alert are defined via an alert control interface 500 which is depicted in FIG. 5. The alert control interface provides a send alert 501 function for sending the defined alert to connected users as well as mechanisms for viewing alert listings 502 and SMS listings 503. Alert control interface also contains a preview 504 that enables the publisher to view the alert as it will be presented to the recipients. When preview 504 is selected a preview window 505 is presented that displays the alert as formatted via formatting control interface 401. Hence publishers can use this mechanism to see how the alert will appear prior to it being broadcast to the various recipient users. The alert listing or the SMS listing provide the publishing user with a mechanism for viewing a complete set of all the alerts, viewing what category 515 each alert is associated with and edit or remove the alert (actions 520). The edit action grants the publisher access to the alert data in a form similar to the formatting control interface 401 and hence provides the user with a way to change the appearance and content of the alert. SMS alerts can also be so modified, deleted and sent via alert control interface 500. An example of the interface presented when the alert listing is selected is depicted at 510.

Figure 6:
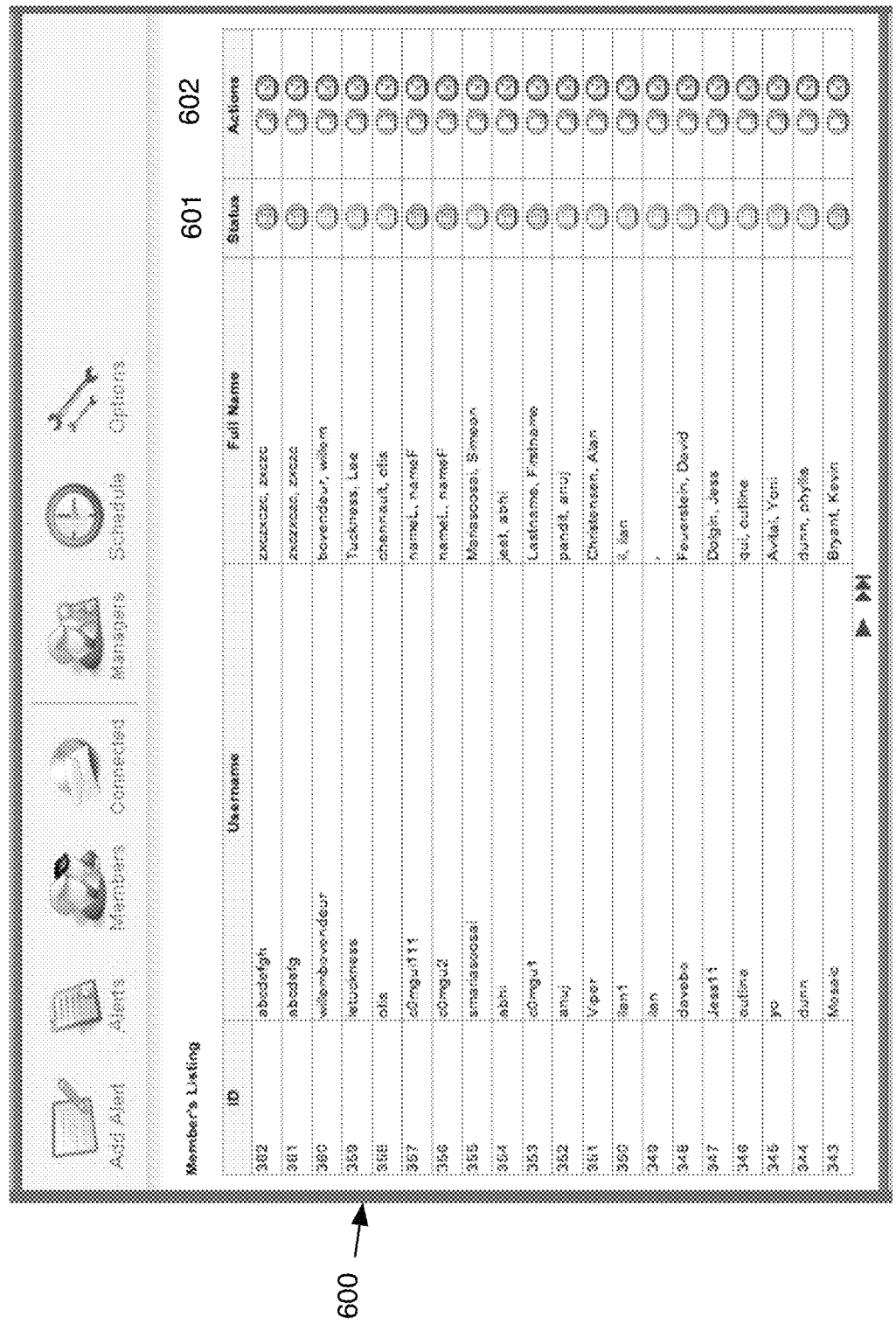
FIG. 6 depicts a member-listing interface configured in accordance with one or more embodiments of the invention.

FIG. 6 depicts a member-listing interface configured in accordance with one or more embodiments of the invention. Member listing 600 comprises a member ID, username, full name, status and actions list. Status 601 indicates whether the associated user name is currently subscribed and thereby capable of receiving alert data. In one or more embodiments, publishers and//or recipients can deactivate the subscription. One or more embodiments provide publishers the ability to restrict user deactivation of a subscription. Actions 602 provide functionality for editing or deleting a member. Edit mode provides an interface for collecting information about the member/user and thereby provides a mechanism for collecting personal information such as a persons address, email, demographic information and any other general information related to a specific member. In one or more embodiments, the collection of personal information is automated from an existing file or database, such as an employee database, a student database, a customer database, or any other file or database containing user information. The member information also identifies the members SMS information (e.g., wireless information/service provider) and category information identifying which categories the member deems to be acceptable. The publisher may optionally override the category selection made by the member-user. The category choices dictate what type of alert data the member will receive. The member-listing interface also provides a mechanism for collecting member information and/or group information.

Figure 7:
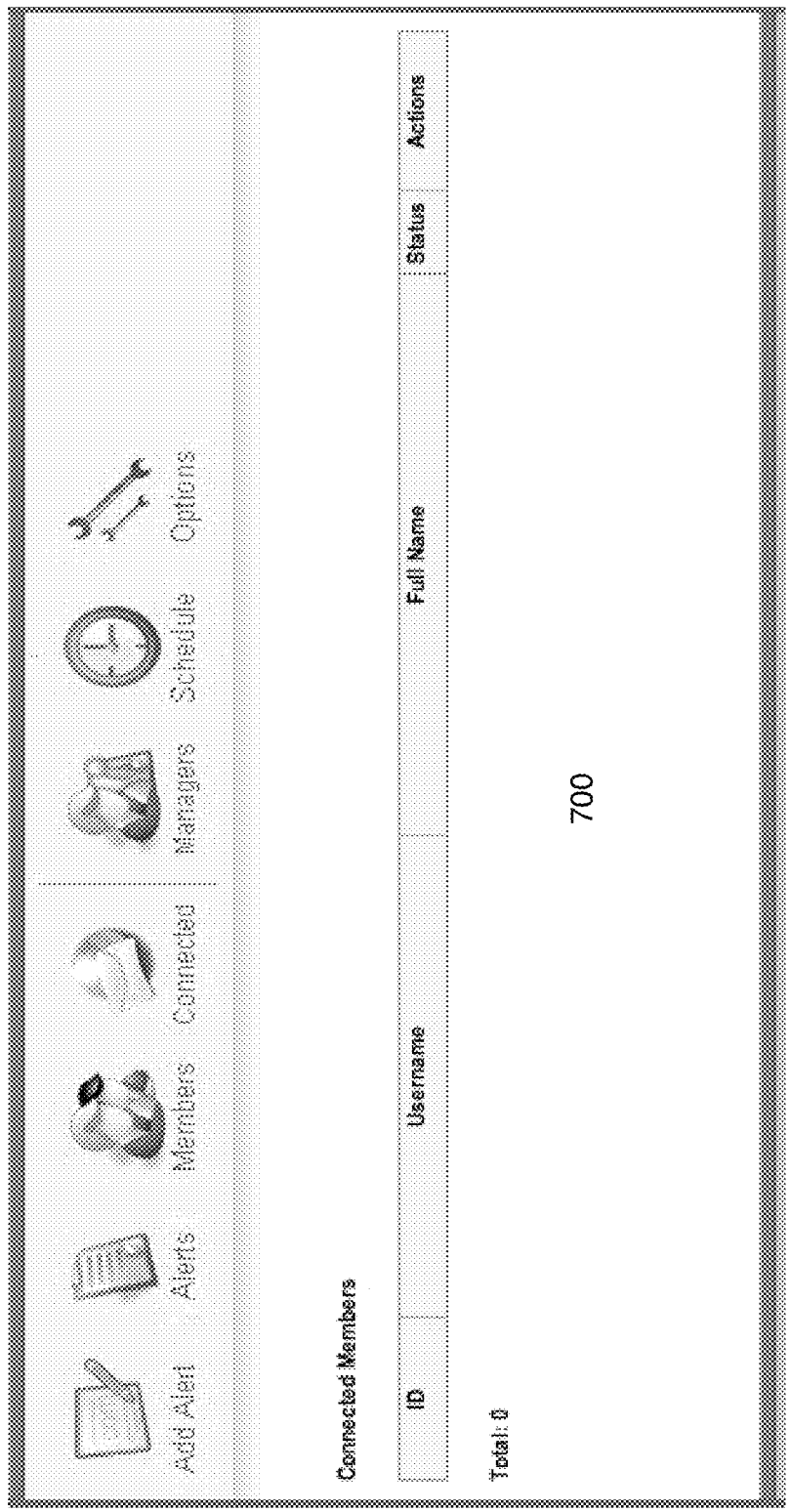
FIG. 7 depicts a member connection interface identifying the members currently connected to the interconnection fabric and capable of receiving packetized alert data.

FIG. 7 depicts a member connection interface identifying the members currently connected to the interconnection fabric and capable of receiving packetized alert data. Using the member connection interface the publisher-user is able to discern which users are connected and have a mechanism for identifying the ID, username, full name, status, or any other data of the user as well as take actions specifically related to the identified user.

FIG. 8 depicts a manager identification interface configured in accordance with one or more embodiments of the invention. The manager identification interface provides a mechanism for adding new managers (e.g., publisher-users) that have the ability to determine one or more users that can administer the system and thereby define users who will receive alert data. Management identification interface 800 identifies the ID, username, full name, company and actions (e.g., edit or delete) that can be taken with respect to the administrative/publishing user. In one or more embodiments, a manager is authorized to publish packetized alert data associated with one or more categories.

In one or more embodiments but not by way of limitation, a publisher, such as a employer, university, school, or any other publisher, may require recipient users to receive instantaneous alert data, including instantaneous alert data associated with one or more categories. For example, but not by way of limitation, a university publisher may require registered students to receive instantaneous alert data from one or more categories, such as instantaneous alert data associated with a category for a course for which the student is registered, an association for which the student is a member, a general category for all registered students, or any other category for which alerts are separately manageable. At least one manager with authority to publish instantaneous alert data to a specific category is able to contact students associated with the specific category. In a university setting, a manager may be a dean, a director, a registrar, a professor, a teaching assistant, or any other publisher-user who has authority to publish instantaneous alert data to a specific category.

In one or more embodiments but not by way of limitation, a recipient user may subscribe for a service providing instantaneous alert data, including a paid subscription for one or more categories of instantaneous alert data. At least one manager with authority may publish instantaneous alert data to a specific category to which a recipient user is subscribed.

Figure 9:
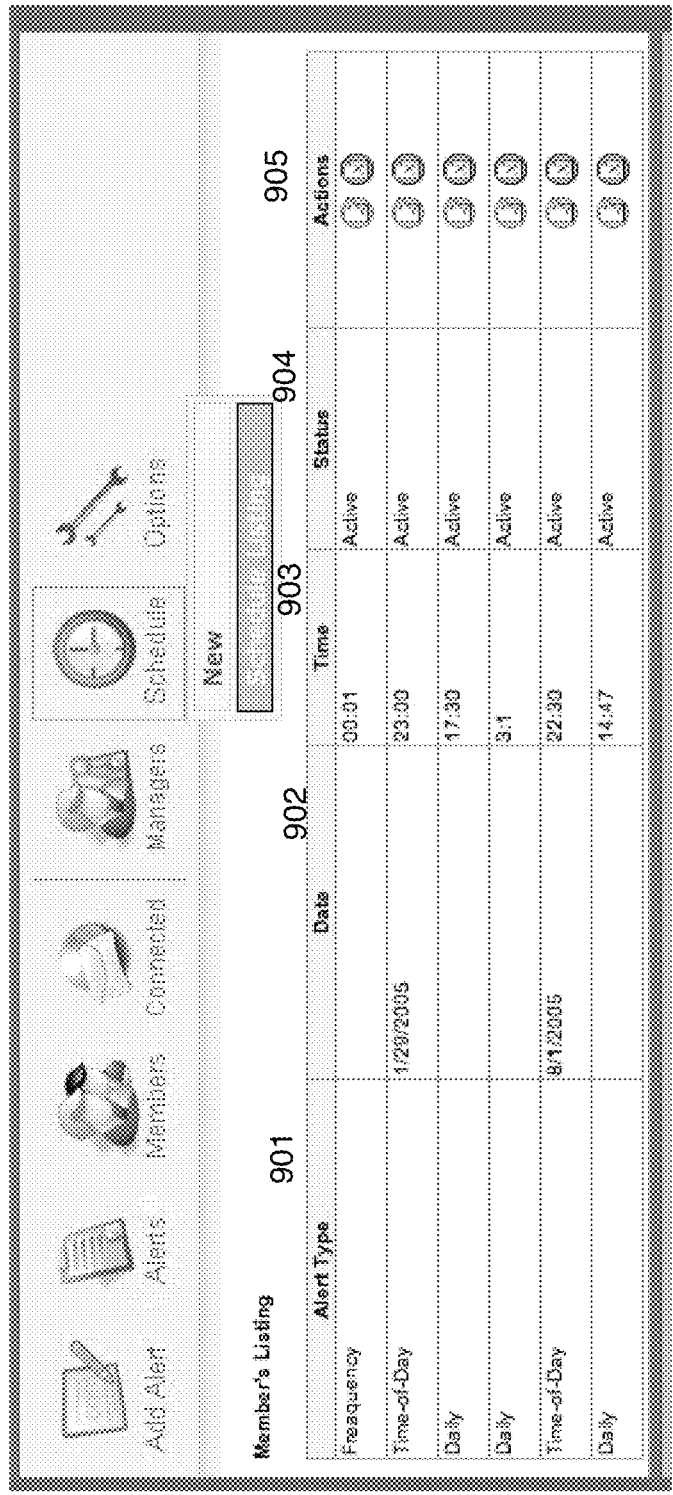
FIG. 9 illustrates a schedule definition interface configured in accordance with one or more embodiments of the invention.

FIG. 9 illustrates a schedule definition interface 900 configured in accordance with one or more embodiments of the invention. The schedule definition interface provides functionality for defining an alert type 901, date 902, time 903, status 904, and actions specific 905 to a particular user or set of users. The alert type defines the specific criteria under which a member or recipient-user may receive alert data. The alert type may, for instance define a frequency, time-of-day or whether the alert data is received daily. The user and/or publisher may set a specific time for receiving the alert data, define the frequency for receiving such data (continuously, intermittently, etc. . . . ) or also define that the alerts are to be received daily. Date information identifying the date the user started to receive alert data and/or date related to other user related events. Time data, status data (active/inactive) and/or actions (edit or delete member information is also defined via the schedule definition interface.

Figure 10:
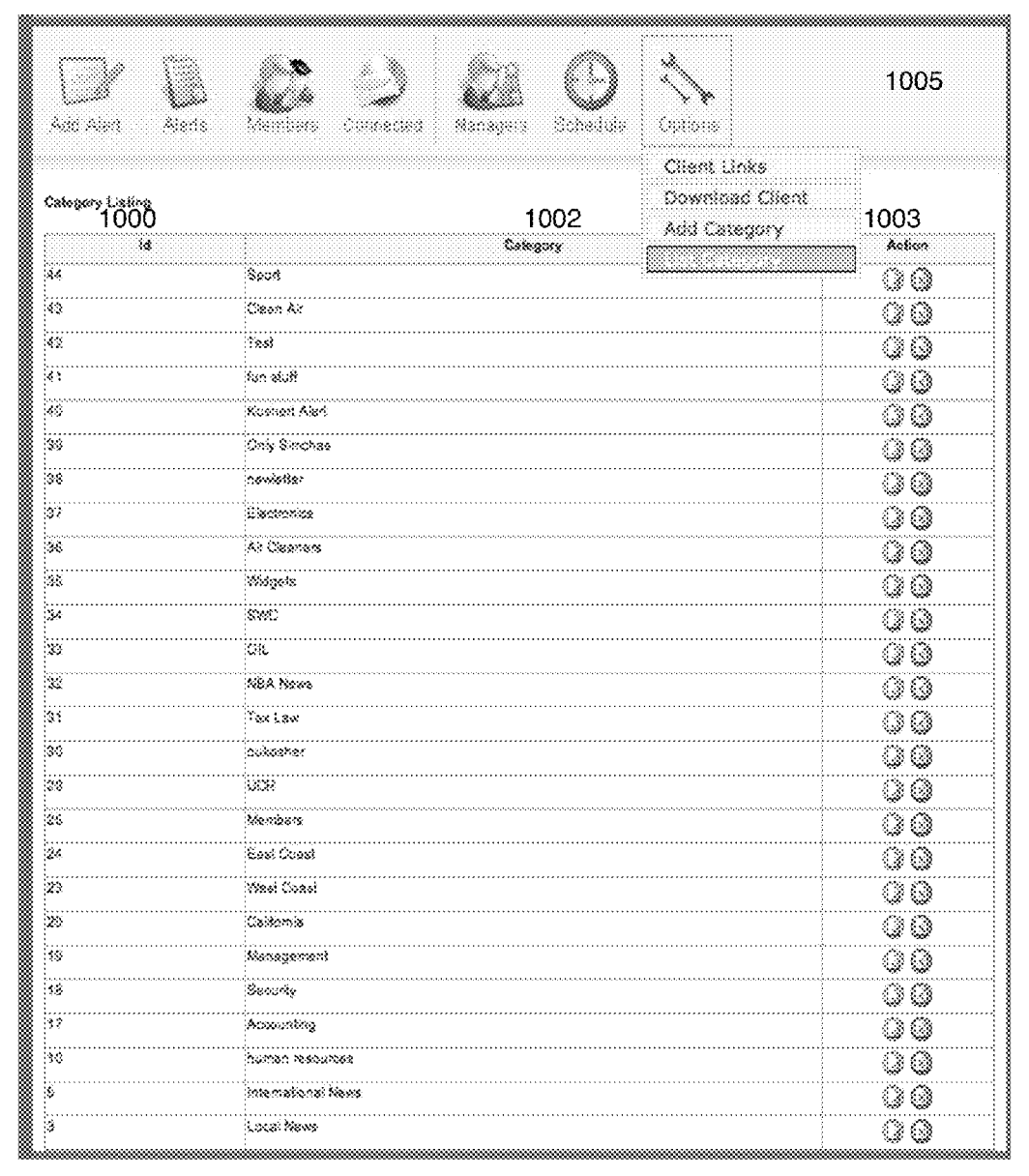

FIG. 10 illustrates an options interface for defining publisher specific preferences. The option interface 1005 contains functions for generating a view of all currently category listings and functionality for adding one or more categories. Each category has a unique ID 1000, a name 1002 and actions 1003 associated with the category. Publishing users can add and/or remove categories via a category-listing interface selected via the options menu and depicted in FIG. 10. Option interface 1005 also comprises functions for specifying client links and client download data. A publisher can, for instance, specify via a download client interface a location of an executable client program configured to install software for implementing the system described herein. In other cases the publisher may specify other programs recipient-users can access for download.

Figure 11:
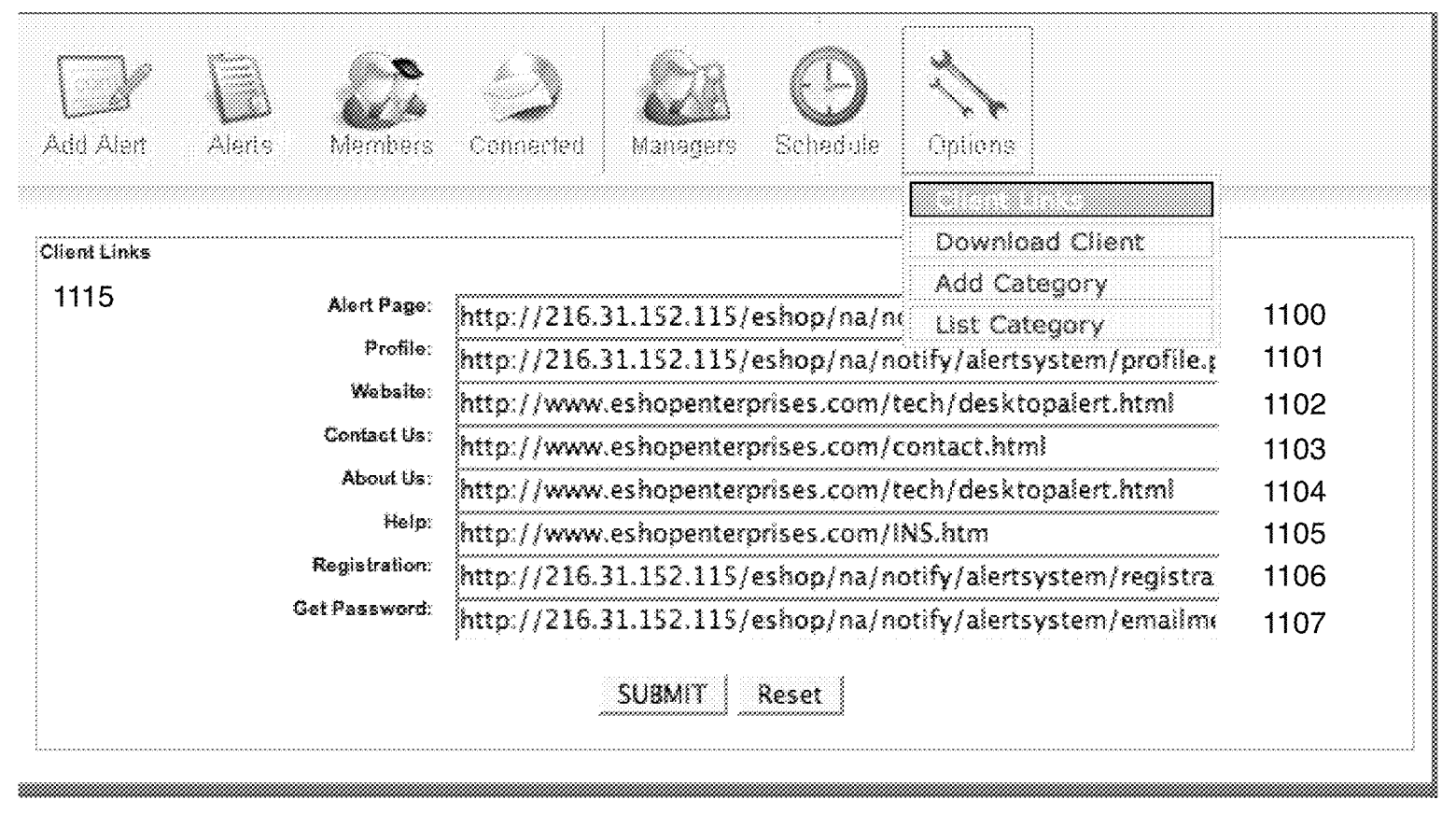

FIG. 11 depicts the client link interface 1115 and illustrates some of the types of information 1100-1107 that can be customized to fit a particular publisher. The ability to globally change link information pushed to a set of receiving users on a customized per publisher basis is advantageous because it enables the rapid setup and deployment of systems for disseminating alert data. Publisher can define specifics that relate to a single publisher or a single hub-publisher can define different specifics for each publisher the hub-publisher is hosting. In this instance a single entity acts as a hub-publisher and offers alert services to a plurality of other publishers. Specific preferences for each publisher can be defined in link interface 1115. In other cases link interface 1115 is used to define link preferences for an individual publisher. In either case link interface 1115 is used to define a set of links (e.g., URLs or hyperlinks) pushed to the user who has subscribed or consented to receiving information from a particular publisher without having to initiate a specific request for every alert or message to be disseminated. In one embodiment of the invention link interface provides publishers with a mechanism for defining an alert page 1100, a profile 1101, a website 1102, contact information 1103, about information 1104, help information 1105, registration information 1106, and password information 1107. The link and data defined as an alert page defines the format and content of the data that is to be transmitted or pushed to the user. Alert page 1100 is associated with the alert listing and is in one embodiment of the invention the data created via the alert edit interface. Alert page 1100 enables the publishing user to control the general format (e.g., look and feel) of the alert data. Profile 1101 and other informational links 1102-1107 are publisher specific and thereby customizable on a per publisher basis. A publisher can for instance change what is displayed to recipient-users when a link that is pushed to them is selected by modifying the pages and/or link information associated with informational links 1102-1107. What information is collected from a registering user can, for instance be modified by changing the registration link or the page to which the registration link 1106 point to. In cases where the system is used to conduct surveys and or collect other data (e.g., form data) from the recipient-users the publisher may wish to modify the information collected from the user via the registration interface in order to make sure that surveys are targeted at people that meet specific criteria. The other informational links are similarly customizable as needed by the publisher. Hence the publisher can tightly control what type of information is collected from and disseminated to receiving-users.

One embodiment of the invention comprises an administration interface configured to initiate a process for auto billing all accounts associated with one or more recipient computers. Billing information such as credit card or other payment information (which is typically collected during registration) is batched and sent to an approval gateway 150 for processing. The validity of the payment information is verified at approval gateway 150 and payment is recorded when an approval is provided. In instances where the payment information is declined, the approval gateway determines the reason for the declination (e.g., lack of funds or an expired card) and automatically generates notification requesting the recipient-user provide an alternative means of payment or update their payment information. These notification messages can be sent via e-mail or transmitted to select users through the publishing system described herein. If the user responds by providing payment information with a period of time set by the publisher, that information is again submitted to the approval gateway for processing. If the payment information is approved, payment is recorded. If payment information is not received within the appropriate timeframe or payment is again declined, the conduit 160 between the publishing system and the recipient computer is terminated.

When recipient-users access third-party server(s) 120n and the transaction to be performed at third-party server(s) 120n requires the processing of payment information the third-part server may make use of the information provided by the recipient-user to publishing system 120 (e.g., during registration) and use that information to process payments for its own services. In such cases the entity associated with the third-party server is able to avoid having to collect payment information from the recipient-user that is already on file with the publishing system. In cases where third-party server is associated with an entity independent of publishing system(s) 120, the entity providing the payment information may draw a commission for the transaction and/or a referral fee for directing recipient-users to third-party server 120n. Hence the entity broadcasting messages can be compensated for driving sales to a third-party server. In other cases the entity associated with third-party server 120n pays a monthly fee to publishing system 120.

Figure 13:
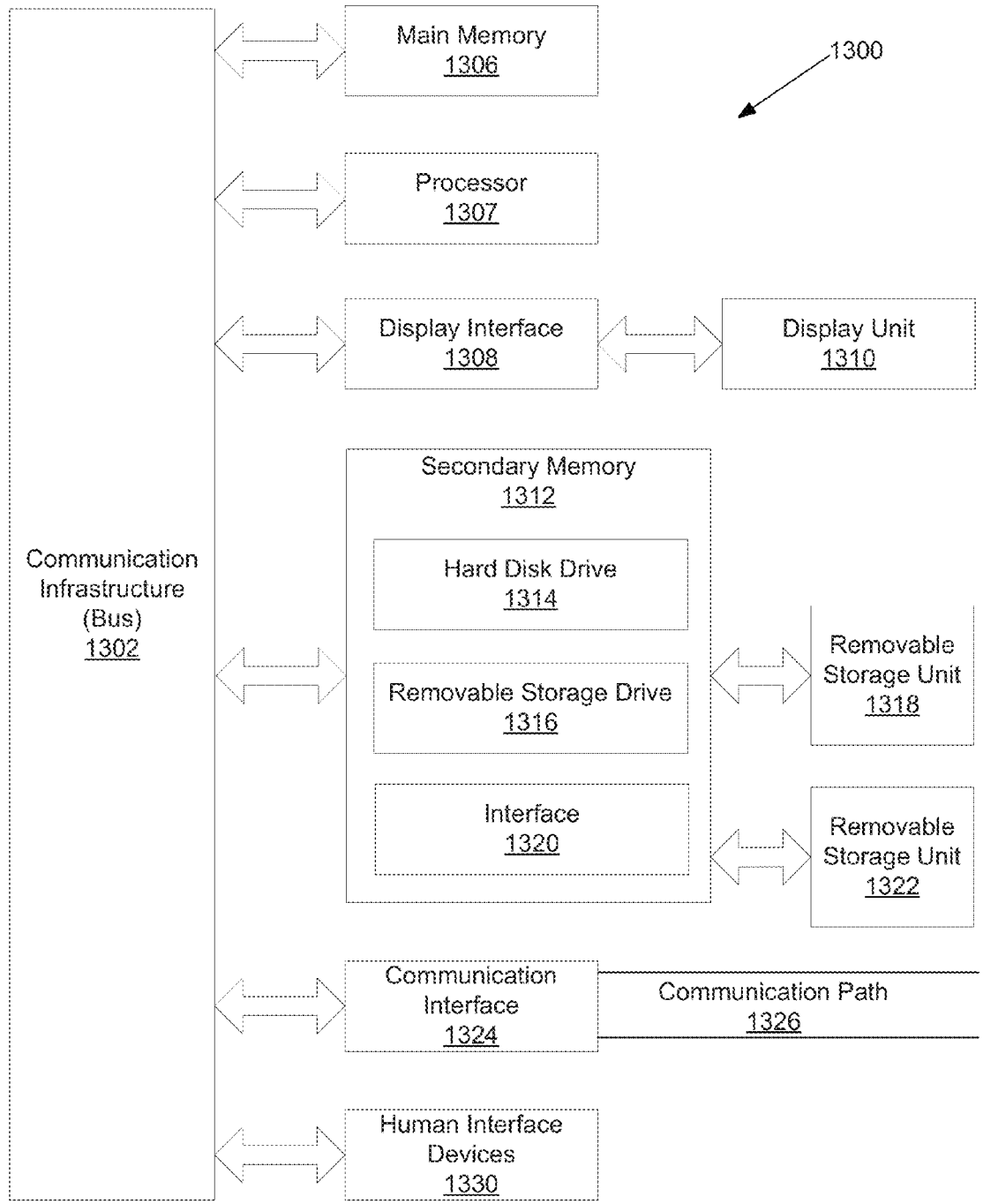
FIG. 13 illustrates a general-purpose computer and peripherals that when programmed as described herein may operate as a specially programmed computer capable of implementing one or more methods, apparatus and/or systems of the solution.

FIG. 13 diagrams a system 1300 comprising a general-purpose computer and peripherals, when programmed as described herein, may operate as a specially programmed computer capable of implementing one or more methods, apparatus and/or systems of the solution described in this disclosure. Processor 1307 may be coupled to bi-directional communication infrastructure 1302 such as communication infrastructure system bus 1302. Communication infrastructure 1302 may generally be a system bus that provides an interface to the other components in the general-purpose computer system such as processor 1307, main memory 1306, display interface 1308, secondary memory 1312 and/or communication interface 1324.

Main memory 1306 may provide a computer readable medium for accessing and executed stored data and applications. Display interface 1308 may communicate with display unit 1310 that may be utilized to display outputs to the user of the specially-programmed computer system. Display unit 1310 may comprise one or more monitors that may visually depict aspects of the computer program to the user. Main memory 1306 and display interface 1308 may be coupled to communication infrastructure 1302, which may serve as the interface point to secondary memory 1312 and communication interface 1324. Secondary memory 1312 may provide additional memory resources beyond main memory 1306, and may generally function as a storage location for computer programs to be executed by processor 1307. Either fixed or removable computer-readable media may serve as secondary memory 1312. Secondary memory 1312 may comprise, for example, hard disk 1314 and removable storage drive 1316 that may have an associated removable storage unit 1318. There may be multiple sources of secondary memory 1312 and systems implementing the solutions described in this disclosure may be configured as needed to support the data storage requirements of the user and the methods described herein. Secondary memory 1312 may also comprise interface 1320 that serves as an interface point to additional storage such as removable storage unit 1322. Numerous types of data storage devices may serve as repositories for data utilized by the specially programmed computer system. For example, magnetic, optical or magnetic-optical storage systems, or any other available mass storage technology that provides a repository for digital information may be used.

Communication interface 1324 may be coupled to communication infrastructure 1302 and may serve as a conduit for data destined for or received from communication path 1326. A network interface card (NIC) is an example of the type of device that once coupled to communication infrastructure 1302 may provide a mechanism for transporting data to communication path 1326. Computer networks such Local Area Networks (LAN), Wide Area Networks (WAN), Wireless networks, optical networks, distributed networks, the Internet or any combination thereof are some examples of the type of communication paths that may be utilized by the specially program computer system. Communication path 1326 may comprise any type of telecommunication network or interconnection fabric that can transport data to and from communication interface 1324.

To facilitate user interaction with the specially programmed computer system, one or more human interface devices (HID) 1330 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 1307 to trigger one or more responses from the specially programmed computer are within the scope of the system disclosed herein.

While FIG. 13 depicts a physical device, the scope of the system may also encompass a virtual device, virtual machine or simulator embodied in one or more computer programs executing on a computer or computer system and acting or providing a computer system environment compatible with the methods and processes of this disclosure. Where a virtual machine, process, device or otherwise performs substantially similarly to that of a physical computer system, such a virtual platform will also fall within the scope of disclosure provided herein, notwithstanding the description herein of a physical system such as that in FIG. 13.

One or more embodiments are configured to enable the specially programmed computer to take the input data given and transform it into a web-based UI by applying one or more of the methods and/or processes described herein. Thus the methods described herein are able to transform a stored component into a web UI, using the solution disclosed here to result in an output of the system as a web UI design support tool, using the specially programmed computer as described herein.

Hence a method and apparatus for instantaneously deploying packetized alert data is described. The claims however and the fill scope of any equivalents are what describe the metes and bounds of the invention.

What is claimed is:

1. A packetized alert system comprising at least one processor and a non-transitory computer-readable medium encoded with computer readable instructions, the alert system for displaying alerts from at least one publisher to plural subscribed users, wherein execution of said computer-readable instructions is configured to cause at least one publisher processor to execute steps comprising:
    providing publisher settings for said at least one publisher processor;
    obtaining subscribed user information from computing devices of the plural subscribed users, the subscription information corresponding to the at least one publisher;
    obtaining from the computing devices of the plural users individual user settings for each of said plural subscribed users;
    providing to each of the plural subscribed users at least one alert category which said each user may select;
    determining connected users of said plural users based on (i) the obtained individual user settings, and (ii) said publisher settings, wherein said connected users comprise one or more of the plural users that are currently connected to a network to which the at least one processor and the at least one publisher are also connected;
    transmitting said packetized alert data to said connected users over said network, said transmitting configured to cause a web browser to be launched on the computing devices of the connected users; and
    transmitting to at least one connected user override information configured to override that user's individual user settings.

2. The packetized alert system of claim 1, wherein said steps further comprise:
    accepting a two-way packetized alert data comprising a response request from a requesting publisher;
    transmitting said two-way packetized alert data to the connected users;
    aggregating a plurality of user responses to said two-way packetized alert data; and
    providing the aggregated response data to the said response request to said requesting publisher.

3. The packetized alert system of claim 1, wherein said steps further comprise providing an alert creation interface to at least one administrator of at least one of said publishers, and wherein said alert creation interface is configured to enable said at least one administrator to customize content of said packetized alert data.

4. The packetized alert system of claim 3, wherein said alert creation interface is configured to enable said at least one administrator to customize timing of sending said packetized alert data.

5. The packetized alert system of claim 1, wherein said packetized alert data is configured to include any of HTML data, XML data, text data, image data, audio data, video data, and plug-in data.

6. The packetized alert system of claim 1, wherein said steps further comprise generating a web page object comprising said packetized alert data as a single atomic unit.

7. The packetized alert system of claim 6, wherein said steps further comprise generating a URL for said packetized alert data, and wherein the transmitting comprises pushing said URL based on said subscription information and publisher account settings.

8. The packetized alert system of claim 1, wherein said steps further comprise accepting publisher billing preferences from at least one publisher.

9. The packetized alert system of claim 8, wherein transmitting said packetized alert data to said connected users is further based on said publisher billing preferences.

10. The packetized alert system of claim 1, wherein the steps comprise obtaining publisher settings between said plural users and said at least one publisher, wherein said publisher settings comprise at least one individual user preference for a specific publishing server.

* * * * *